United States Patent
Yach et al.

(10) Patent No.: US 8,542,606 B2
(45) Date of Patent: *Sep. 24, 2013

(54) METHOD AND DEVICE FOR PREDICTING MESSAGE RECIPIENTS

(75) Inventors: David Paul Yach, Waterloo (CA); Harry Richmond Major, Waterloo (CA); Ronald Scotte Zinn, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 191 days.

This patent is subject to a terminal disclaimer.

(21) Appl. No.: 12/949,847

(22) Filed: Nov. 19, 2010

(65) Prior Publication Data

US 2011/0078265 A1 Mar. 31, 2011

Related U.S. Application Data

(63) Continuation of application No. 11/216,119, filed on Sep. 1, 2005, now Pat. No. 7,853,656.

(51) Int. Cl.
*H04L 12/26* (2006.01)
*H04L 12/58* (2006.01)
*H04H 20/71* (2008.01)
*H04M 3/44* (2006.01)
*G06F 17/30* (2006.01)

(52) U.S. Cl.
USPC ..... 370/252; 370/312; 379/93.24; 455/412.1; 707/748; 707/752

(58) Field of Classification Search
USPC ........................................ 709/206
See application file for complete search history.

(56) References Cited

U.S. PATENT DOCUMENTS

| 5,765,033 | A | 6/1998 | Miloslavsky |
| 6,360,251 | B1 | 3/2002 | Fujita et al. |
| 6,952,805 | B1 * | 10/2005 | Tafoya et al. ............... 715/739 |
| 7,853,656 | B2 | 12/2010 | Yach et al. |
| 2001/0002469 | A1 * | 5/2001 | Bates et al. .................... 707/1 |
| 2002/0103873 | A1 | 8/2002 | Ramanathan et al. |
| 2002/0178229 | A1 | 11/2002 | Sinha et al. |

(Continued)

FOREIGN PATENT DOCUMENTS

| CA | 2555389 C | 1/2012 |
| EP | 1760645 B1 | 11/2007 |
| EP | 1843287 B1 | 10/2010 |

OTHER PUBLICATIONS

European Examination Report dated Oct. 9, 2008, European Patent Application No. 07113141.1.

(Continued)

*Primary Examiner* — Alpus H Hsu
*Assistant Examiner* — Walter Divito
(74) *Attorney, Agent, or Firm* — Bereskin & Parr LLP/S.E.N.C.R.L., s.r.l.

(57) ABSTRACT

A method and communications device is provided for determining a list of possible additional recipients to add to an electronic message that is composed by a user of the communications device for transmission to another communications device. Once the user indicates that there is an additional recipient for the distribution list of the electronic message, the device employs the method to create the list of possible additional recipients. The method may be implemented on a computer program product.

23 Claims, 8 Drawing Sheets

(56) References Cited

U.S. PATENT DOCUMENTS

| | | | |
|---|---|---|---|
| 2003/0233419 A1* | 12/2003 | Beringer | 709/206 |
| 2004/0153519 A1 | 8/2004 | Stolze | |
| 2004/0203949 A1 | 10/2004 | Nielsen et al. | |
| 2005/0204009 A1* | 9/2005 | Hazarika et al. | 709/206 |
| 2007/0050455 A1 | 3/2007 | Yach et al. | |

OTHER PUBLICATIONS

Extended European Search Report dated Oct. 9, 2007, European Patent Application No. 07113141.1.
European Search Report dated Jan. 31, 2006, European Patent Application No. 05108030.7.
European Examination Report dated Dec. 9, 2006, European Patent Application No. 05108030.7.
Response to European Search Report, European Application No. 05108030.7, dated Oct. 24, 2006.
Response to European Search Report, European Application No. 05108030.7, dated Mar. 14, 2006.
Notice of Intent to Grant, European Application No. 05108030.7, dated Apr. 5, 2007.
Decision to Grant, European Application No. 05108030.7, dated Nov. 2, 2007.
European Search Report, European Application No. 05108030.7, dated Sep. 12, 2006.
European Search Report, European Application No. 07113141.1, dated Sep. 10, 2007.
Response to European Search Report, European Application No. 07113141.1, dated Jan. 7, 2008.
European Search Report, European Application No. 07113141.1, dated Oct. 9, 2008.
Response to European Search Report, European Application No. 07113141.1, dated Dec. 8, 2008.
Summons to attend oral proceedings, European Application No. 07113141.1, dated Feb. 12, 2010.
Response to Summons, European Application No. 07113141.1, dated Apr. 29, 2010.
Result of Consultation, European Application No. 07113141.1, dated May 3, 2010.
Applicants Summary of Consultation, European Application No. 07113141.1, dated May 4, 2010.
Decision to Grant, European Application No. 07113141.1, dated Sep. 30, 2010.
Notice of Intent to Grant, European Application No. 07113141.1, dated Jun. 15, 2010.

* cited by examiner

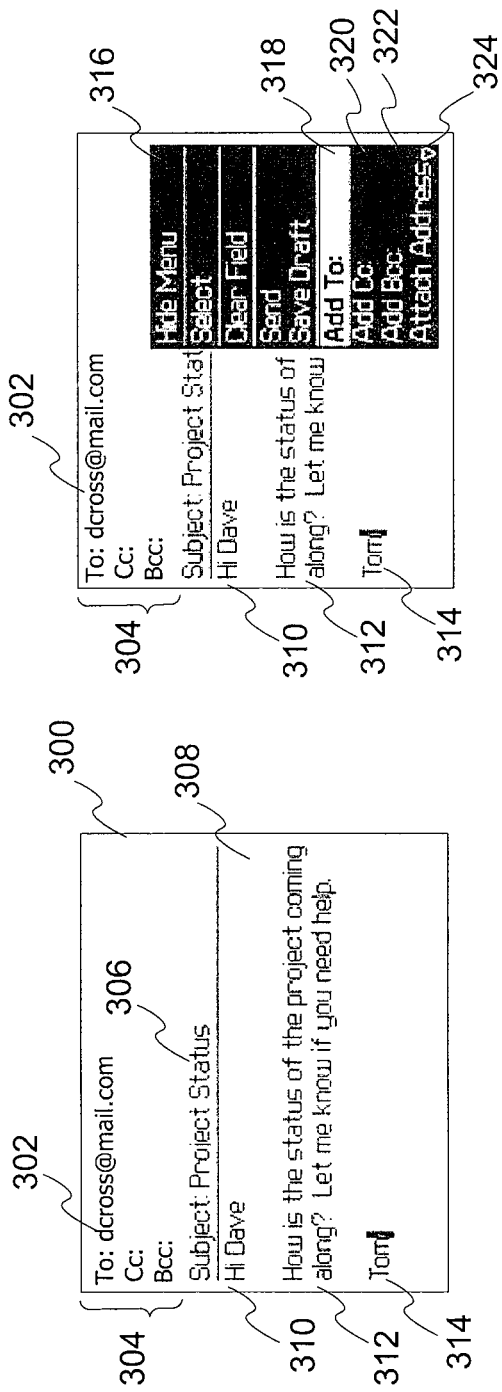
FIG. 5A
FIG. 5B
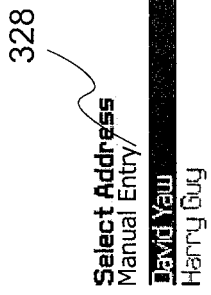
FIG. 5C

METHOD AND DEVICE FOR PREDICTING MESSAGE RECIPIENTS

CROSS-REFERENCE TO RELATED APPLICATIONS

This application is a continuation of, and claims priority to, prior U.S. patent application Ser. No. 11/216,119, filed on Sep. 1, 2005, the entirety of which is hereby incorporated by reference.

COPYRIGHT NOTICE

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

FIELD

The embodiments described herein relate to the field of data communication. More particularly, the embodiments described herein relate to a method and device for message delivery between communication devices.

BACKGROUND

Message delivery refers to the communication of messages between data communication devices. The messages may include e-mail, instant messages or exchanging documents between two or more data communication devices. Data communication devices generally include any computing device such as a personal computer, laptop, as well as facsimile machines, personal digital assistants or other mobile communication devices. The data communication may be "wireless" or "wired".

E-mail messages, and particularly wireless e-mail messages, are one of the more popular forms of data communication. E-mail messages are usually sent to more than one recipient. In order to enter multiple recipients, the sender manually inputs the name of each recipient in the "TO", "CC" or "BCC" address fields of the e-mail message. However, entering multiple recipients, especially for emails that are sent to a large number of recipients, may be a slow and cumbersome task if the user is required to type all of or a portion of the recipient's name.

BRIEF DESCRIPTION OF THE DRAWINGS

For a better understanding of the embodiments described herein and to show more clearly how it may be carried into effect, reference will now be made, by way of example only, to the accompanying drawings which show at least one exemplary embodiment in which:

FIG. 3 is a block diagram of an exemplary embodiment of a node of a wireless network that the mobile communications device of FIG. 1 may communicate with;

FIG. 4 is a block diagram of an exemplary embodiment of a host system that the mobile communications device of FIG. 1 may communicate with;

FIG. 5A is an illustration of an exemplary embodiment of a message created on the mobile communication device of FIG. 1;

FIG. 5B is an illustration of an exemplary embodiment of a trigger event for creating a list of additional possible recipients for the message of FIG. 5A;

FIG. 5C is an illustration of an exemplary list of possible additional recipients for the message of FIG. 5A;

DETAILED DESCRIPTION

Figure 1:
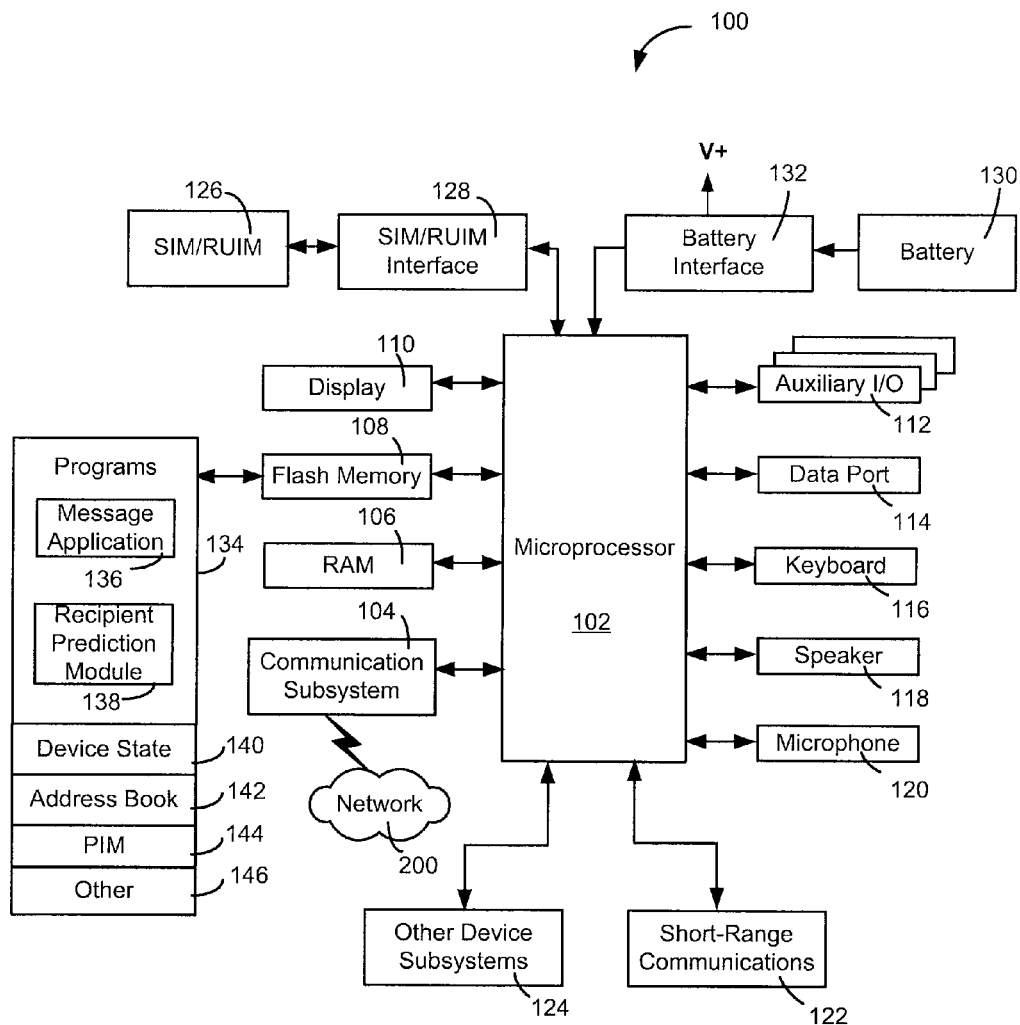
FIG. 1 is a block diagram of an exemplary embodiment of a mobile communication device.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein, but rather as merely describing the implementation of the various embodiments described herein.

The embodiments described herein generally have applicability in the field of data communication for communication devices that can send messages to two or more recipients. To facilitate an understanding of the embodiments, the embodiments will be described in terms of e-mail communication on a mobile wireless communications device that can send messages to two or more recipients. However, it should be understood that the embodiments are not limited to e-mail messages or mobile communication devices. Examples of applicable communication devices include pagers, cellular phones, cellular smart-phones, wireless organizers, personal digital assistants, computers, laptops, handheld wireless communication devices, wirelessly enabled notebook computers and the like, each of which is capable of sending messages to two or more recipients.

Some embodiments make use of a mobile communication device, hereafter referred to as a mobile device, that is a two-way communication device with advanced data communication capabilities having the capability to communicate with other computer systems. The mobile device may also include the capability for voice communications. Depending on the functionality provided by the mobile device, it may be referred to as a data messaging device, a two-way pager, a cellular telephone with data messaging capabilities, a wireless Internet appliance, or a data communication device (with or without telephony capabilities). The mobile device communicates with other devices through a network of transceiver stations. To aid the reader in understanding the structure of the mobile device and how it communicates with other devices and host systems, reference will now be made to FIGS. 1 through 4.

Referring first to FIG. 1, shown therein is a block diagram of a mobile device 100 in one exemplary implementation. The mobile device 100 comprises a number of components, the controlling component being a microprocessor 102 which controls the overall operation of mobile device 100. Communication functions, including data and voice communications, are performed through a communication subsystem 104. The communication subsystem 104 receives messages from and sends messages to a wireless network 200. In this exemplary implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The microprocessor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications subsystem 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. Operating system software used by the microprocessor 102 is typically stored in a persistent store such as the flash memory 108, which may alternatively be a read-only memory (ROM) or similar storage element (not shown). Those skilled in the art will appreciate that the operating system, specific device applications, or parts thereof, may be temporarily loaded into a volatile store such as the RAM 106.

The mobile device 100 may send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the microprocessor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The microprocessor 102, in addition to its operating system functions, enables execution of software applications 134 on the mobile device 100. The subset of software applications 134 that control basic device operations, including data and voice communication applications, will normally be installed on the mobile device 100 during its manufacture.

The software applications 134 include a message application 136 and a recipient prediction module 138. The message application 136 can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages may be stored remotely from the device 100 such as in a data store of an associated host system that the mobile device 100 communicates with. For instance, in some cases, only recent messages may be stored within the device 100 while the older messages may be stored in a remote location such as the data store associated with a message server. This may occur when the internal memory of the device 100 is full or when messages have reached a certain "age", i.e. messages older than 3 months may be stored at a remote location. In an alternative implementation, all messages can be stored in a remote location while only recent messages can be stored on the mobile device 100.

The recipient prediction module 138 can be used to predict a list of additional possible recipients when the user of the mobile device 100 composes an electronic message with the message application 136 and indicates that the electronic message is to be sent to two or more recipients. The operation of the recipient prediction module 138 is discussed in further detail below. The recipient prediction module 138 can be created using any suitable software programming language as is well known to those skilled in the art.

The mobile device 100 further includes a device state module 140, an address book 142, a Personal Information Manager (PIM) 144, and other modules 146. The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book, the information can include the name, phone number, work address and email address of the contact, among other information. The other modules 146 may include a configuration module (not shown) as well as other modules that can be used in conjunction with the SIM/RUIM interface 128.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications may also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication. The data port 114 may be any suitable port that enables data communication between the mobile device 100 and another computing device. The data port may be a serial or a parallel port. In some instances, the data port 114 may be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, may also be implemented on the mobile device 100. Although voice or audio signal output is accomplished primarily through the speaker 118, the display 110 may also be used to provide additional information such as the identity of a calling party, duration of a voice call, or other voice call related information.

Figure 2:
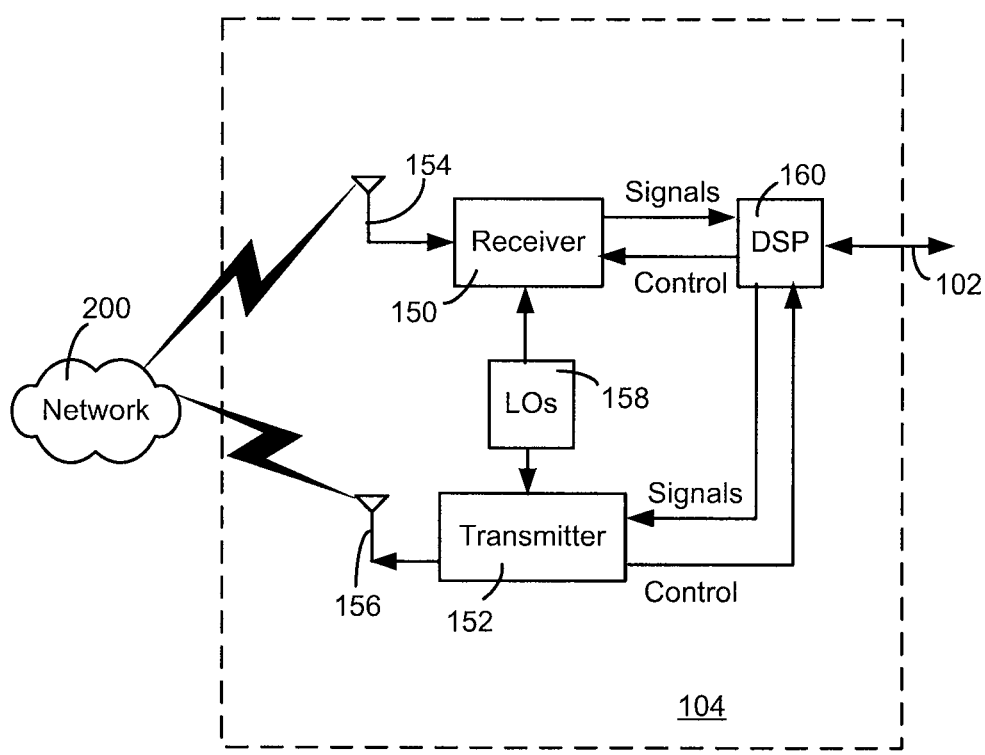
FIG. 2 is a block diagram of a communication subsystem component of the mobile communication device of FIG. 1.

Referring now to FIG. 2, a block diagram of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a processing module such as a Digital Signal Processor (DSP) 160. As will be apparent to those skilled in the field of communications, the particular design of the communication subsystem 104 is dependent upon the communication network with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and transmitter 152 may be adaptively controlled through automatic gain control algorithms implemented in the DSP 160.

The wireless link between the mobile device 100 and the wireless network 200 may contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
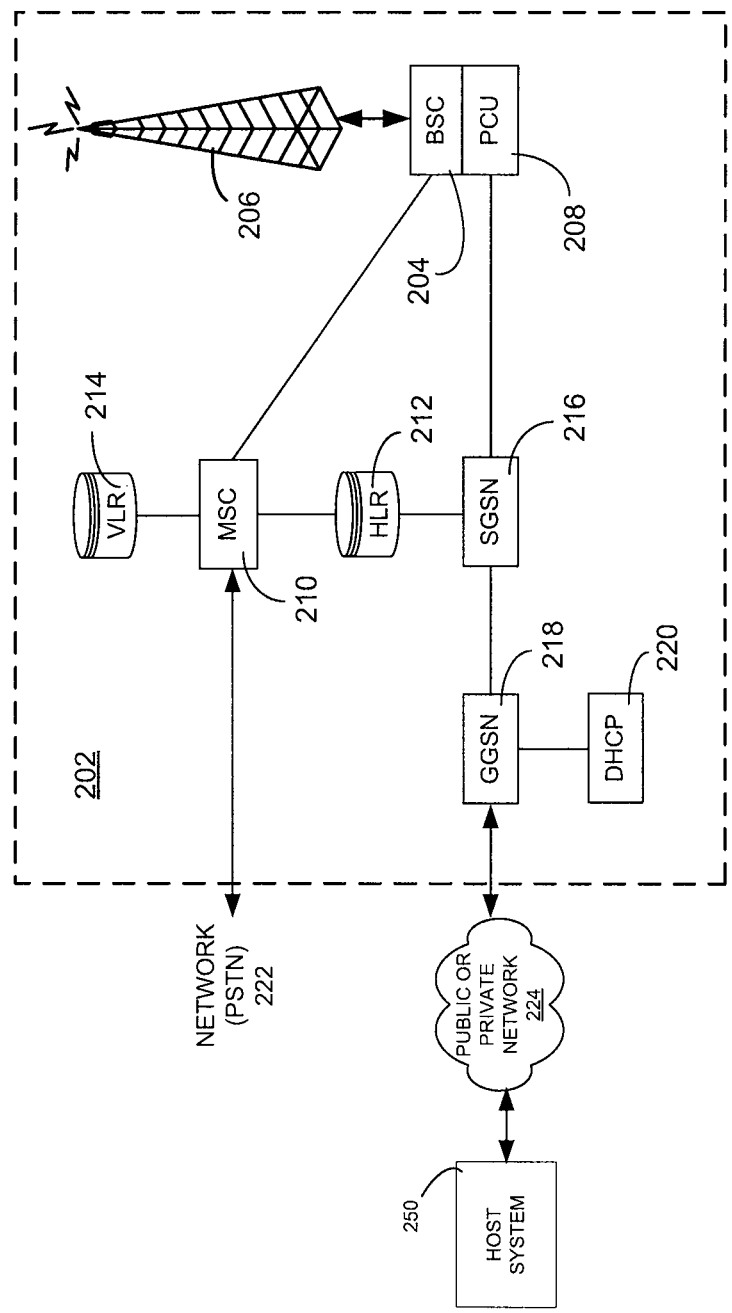

Referring now to FIG. 3, a block diagram of an exemplary implementation of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the wireless network 200.

In a GSM network, the MSC 210 is coupled to the BSC 204 and to a landline network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Figure 4:
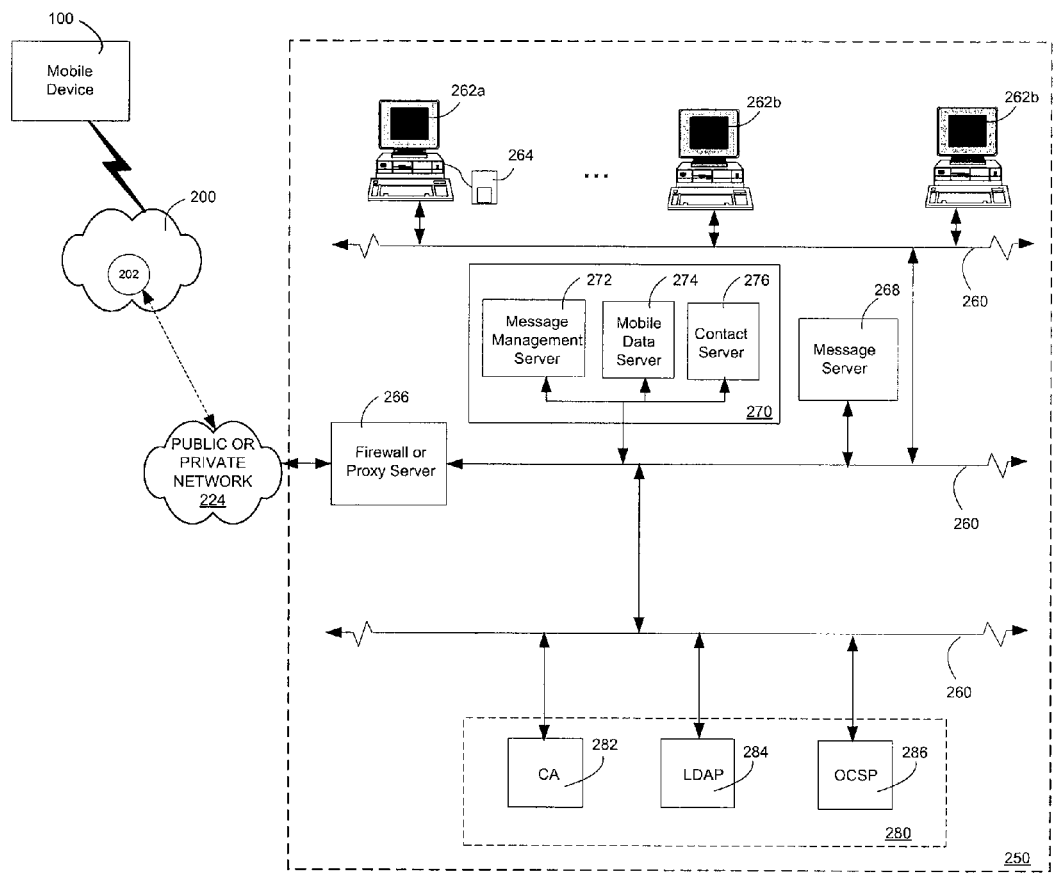

Referring now to FIG. 4, shown therein is a block diagram illustrating components of an exemplary configuration of a host system 250. In one instance, the host system 250 may be a corporate enterprise. The host system 250 will typically be a corporate office or other local area network (LAN), but may also be a home office computer system or some other private system, for example, in variant implementations. In the example shown in FIG. 4, the host system 250 is depicted as a LAN of an organization to which a user of the mobile device 100 belongs. Typically, a plurality of mobile devices can communicate wirelessly with the host system 250 through one or more nodes 202.

The host system 250 comprises a number of network components connected to each other by the LAN connections 260. For instance, a user's desktop computer 262a with an accompanying cradle 264 for the user's mobile device 100 is situated on a LAN connection. The cradle 264 for the mobile device 100 may be coupled to the computer 262a by a serial or a Universal Serial Bus (USB) connection, for example. Other user computers 262b are also situated on the LAN 260, and each may or may not be equipped with an accompanying cradle 264 that is suitable for a mobile device. The cradle 264 facilitates the loading of information (e.g. PIM data, private symmetric encryption keys to facilitate secure communications between the mobile device 100 and the host system 250, etc) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a, 262b will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

In this exemplary embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless Internet gateway for the host system 250. The proxy server 266 intelligently routes data to the correct destination server.

In a variant implementation, the host system 250 includes a wireless VPN router (not shown) to facilitate data exchange between the host system 250 and the mobile device 100. The wireless VPN router enables a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or to a different wireless network, or from a different computing device or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In an alternative embodiment, the data store may be a separate hardware unit (not shown) that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (in the past two to three months for example) can be stored on the mobile device 100.

When operating the mobile device 100, the user may wish to have e-mail messages retrieved for delivery to the handheld. An e-mail client application operating on the mobile device 100 may also request messages associated with the user's account from the message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

To facilitate the wireless communication of messages and message-related data between the mobile device 100 and components of the host system 250, a number of wireless communication support components 270 may be provided. In this exemplary implementation, the wireless communication support components 270 can include a message management server 272, a mobile data server 274 and a contact server 276, for example.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES) or Triple DES) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in one instance, when a message is initially retrieved by the mobile device 100 from the message server 268, the message management server 272 may push only the first part of a message to the mobile device 100, with the part being of a pre-defined size (e.g. 2 KB). The user can then request more of the message, to be delivered in similar-sized blocks by the message management server 272 to the mobile device 100, possibly up to a maximum pre-defined message size.

Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion to the address book 142 on the mobile device 100. Accordingly, for a given contact, the contact server 276 can include the name, phone number, work address and email address of the contact, among other information. The contact server 276 can also provide a global address list that contains the contact information for all of the contacts associated with the host system 250.

It will be understood by persons skilled in the art that the message management server 272, the mobile data server 274 and the contact server 276 need not be implemented on separate physical servers within the host system 250. For example, some or all of the functions associated with the message management server 272 may be integrated with the message server 268, or some other server in the host system 250. Furthermore, the host system 250 may comprise multiple message management servers 272, particularly in variant implementations where a large number of mobile devices need to be supported.

Referring now to FIG. 5A, shown therein is an illustration of an exemplary embodiment of a current electronic message 300 created on the mobile device 100 of FIG. 1. The message 300 is created on the mobile device 100 using the message application 136. The message 300 has various address fields including the "To", "Cc" (Carbon copy), and "Bcc" (Blind carbon copy) address fields. There is currently one known recipient "Dave Cross" indicated by the email address "dcross@hotmail.com" in the "To" address field 302. The entries in the "To", "Cc" and "Bcc" address fields of the message 300 collectively form a distribution list 304 for the message 300.

The message 300 further includes a subject field 306 and a message body 308. The subject field "Project Status" indicates the subject of the message 300. The subject field 306, in alternative embodiments, may also indicate whether the message 300 is an original message, a forwarded message (indicated by the label "FW" for example), or a replied message (indicated by the label "RE" for example).

The message body 308 contains the content of the message 300. The message body 308 has several components including an opening salutation 310 (e.g. "Hi Dave"), a main body 312, and a closing signature 314 (e.g. "Tom"). The content of each individual component of the message body 308 may be scanned by the microprocessor 102 of the device 100, or by one of the servers 268, 272 and 274 of the host system 250. In some embodiments, information provided by a component of the message body 308 can be used to predict possible recipients to add to the distribution list 304. The message body 308 may be a "new" message body that the user has just composed prior to adding recipients to the distribution list, or the message 300 may be a forwarded or replied message in which at least a portion of the message body 308 is previously provided in the original message sent to the user.

Referring now to FIG. 5B, shown therein is an illustration of an exemplary embodiment of a trigger event for creating a list of additional possible recipients for the current electronic message 300. In this example, the trigger event is that the user of the mobile device 100 wishes to add another recipient to the distribution list 304. Another example of a trigger event is when the user wishes to invite people to a meeting (in this case all of the embodiments of recipient prediction described herein are applicable). A menu list 316 associated with the message 300 is displayed by the device 100 to allow the user to perform various operations on the message 300 such as sending the message 300, saving the message 300 as a draft for later revision/sending, adding another recipient to the distribution list 304, and the like. The user may display the menu list 316 by actively selecting this option using one of the multiple input means of the device 100. For example, the menu list 316 may be displayed by selecting a pre-defined key on the keyboard 116, touching a portion of the display 110, providing a voice command via the microphone 120, or by using a scroll-wheel or roller control mechanism which can be provided by the auxiliary I/O 112 in some embodiments.

In this example, the user selects the "Add To:" option 318 to add a recipient to the "To" address field of the distribution list 304 of the message 300. The user may also select the "Add Cc:" option 320 to add a recipient to the "Cc" address field of the distribution list 304 of the message 300. In addition, the user may also select the "Add Bcc" option 322 to add a recipient to the "Bcc" address field of the distribution list 304. The "attach address" option 324 allows the user to send address information (much like a business card) via the mobile device 100. The option 324 is optional.

In one embodiment, the trigger event occurs when the user selects any one of the "Add To:", "Add Cc:" and "Add Bcc" options 318, 320 and 322 and there is already a known recipient in the distribution list 304. When the trigger event occurs, the message application 136 instructs the recipient prediction module 138 to execute a recipient prediction method to predict possible additional recipients that the user wishes to add to the distribution list 304. The recipient prediction method is described in more detail below. Once the recipient prediction method is executed, the mobile device 100 may provide an indication to the user that possible additional recipients are being predicted. This indication may be a visual or auditory indication. For example, a dialog box may be displayed on the display 110 or a unique sound may be output via the speaker 118. However, providing an indication is optional since it may be understood by the user that the default operation of the message application 136 is to invoke the recipient prediction method whenever the triggering event occurs.

Referring now to FIG. 5C, shown therein is an illustration of an exemplary list of possible additional recipients 326 for the current electronic message 300. The list of possible additional recipients 326 is displayed once the recipient prediction method has executed based on the current recipients in the distribution list 304 at the time the triggering event occurred. In this exemplary embodiment, the recipient prediction method has scanned one or more associated data stores (i.e. internal to the device 100 and/or remote) of previously sent or received messages for messages in which the current recipient "Dave Cross" is listed in the distribution list (i.e. as a recipient or a sender) and, based on these messages, builds the list of possible additional recipients 326 and displays this list 326 to the user.

In this example, the list of possible additional recipients 326 is provided along with a manual entry option 328. The possible additional recipients 328 in this example are: "David Yaw" and "Harry Guy". If the recipient prediction method is successful and the user of the device 100 actually intended to select either "David Yaw" or "Harry Guy", then the user simply selects one of these choices. In an alternative embodiment, the user may select two or more of the possible additional recipients if they are correct using an appropriate combination of input means. For instance, the user may depress a given key while selecting each of the possible additional recipients that are correct and then releases the key. This reduces the time needed for selecting recipients for the current electronic message 300.

In a further embodiment, the possible additional recipient that is the most likely "candidate", i.e. most likely possible additional recipient, based on some numeric value for example as discussed below, may be the only recipient that is displayed. Further, the most likely possible additional recipient may be displayed by going to the full list of contacts (in the user's address book) and highlighting the most likely possible additional recipient and providing this as a default choice to the user. In some cases, the optional choice of manual entry may also be displayed. In cases, where there are two or more most likely possible additional recipients, then the prediction method may arbitrarily choose the possible additional recipient that is to be shown as the default choice.

If the list of possible additional recipients 326 does not include a recipient that the user intends to add to the distribution list 304 of the current message 300, then the user can select the manual entry option 328. The user can then enter the next recipient by typing all of the recipient address. In other cases, the user may enter just a portion of the recipient address if the message application 136 provides functionality in which one or more recipient addresses is displayed which match the portion of the recipient address that the user has just entered, as is commonly known to those skilled in the art. If the list of possible additional recipients is empty, then the recipient prediction module 138 may simply provide the manual entry option 328 that the user can select. Alternatively, the default action may be that an empty text box is provided in the appropriate To, Cc, or Bcc field within which the user manually enters the intended recipient.

Figures 6, 7:
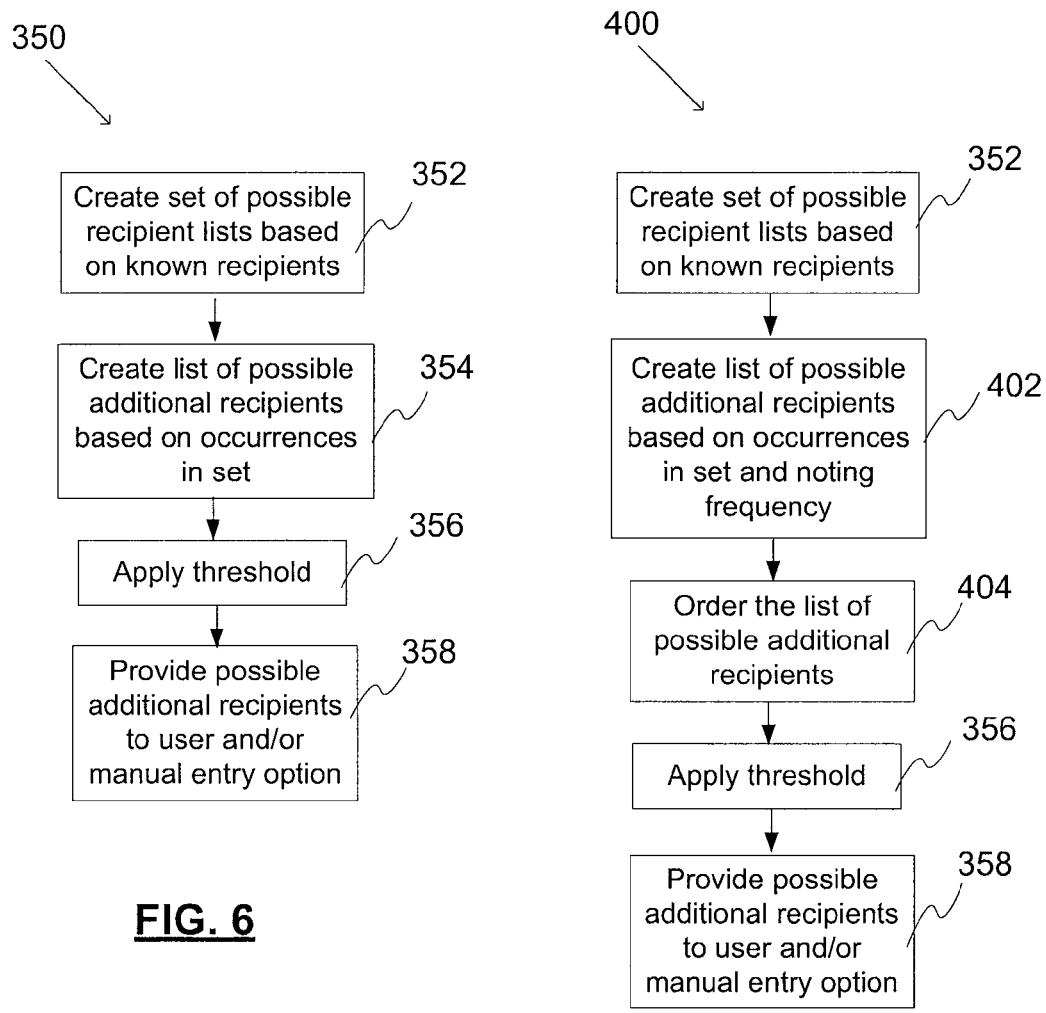
FIG. 6 is a flowchart diagram illustrating an exemplary embodiment of a recipient prediction method that may be used to create a list of additional possible recipients.
FIG. 7 is a flowchart diagram illustrating an alternative exemplary embodiment of a recipient prediction method that may be used to create a list of additional possible recipients.

Referring now to FIG. 6, shown therein is a flowchart diagram illustrating an exemplary embodiment of the recipient prediction method 350 that may be used to create a list of additional possible recipients. The recipient prediction method 350 is based, in part, on the fact that if a previous electronic message has been sent to a given set of recipients, then future related electronic messages will be sent to the same given set of recipients, or at least to some of the recipients from the given set of recipients.

The first step 352 of the method 350 includes creating a set of possible recipient lists based on the known recipients in the distribution list 304. In this embodiment, the set of possible recipient lists is generated by searching through previous electronic messages that have been sent or received by the user and is stored in a message store on the mobile device 100 associated with the message application 136. Alternatively, the electronic messages may be stored remotely from the mobile device 100 such as on a data store associated with the message management server 272 in the host system 250. In either case, in this particular embodiment, a possible recipient list is included in the set of possible recipient lists only if the recipient list includes all of the known recipients in the distribution list 304 of the current message 300.

For a given electronic message, the corresponding given recipient list includes all of the recipients and the sender of the electronic message. Therefore, the given recipient list includes all of the entries in the "To", "Cc", "Bcc" and "From" address fields. It should be noted that the "From" address field is not shown in FIG. 5A since this figure depicts the current electronic message 300 that is being composed and it has not yet been sent. However, almost all received electronic messages normally include the "From" address field as is well known to those skilled in the art. Duplicated entries for a given electronic message can be ignored when generating the given recipient list. For instance, a recipient may be listed under more than one address field in error. In another instance, the user may have sent an email and entered themselves as a recipient in the "Cc" or "Bcc" field. In this case, the user may be listed once in the given recipient list and, in some embodiments, associated with the "Cc" or "Bcc" field, as the case may be, and not with the "FROM" field. Furthermore, recipients that are already listed in the distribution list 304 of the current message 300 are preferably removed at some point from the list of possible additional recipients so that they are not provided as a choice to the user. This can occur when the set of possible recipient lists is being generated.

To reduce computational overhead, a master set of recipient lists may be initialized by generating recipient lists for all messages in the message store associated with the user's message account. For a given electronic message, the associated recipient list includes all of the recipients without any restriction other than to remove duplicated recipients. In some embodiments, the address field associated with the recipient may also be included in the recipient list. In some embodiments, filter data (discussed further below) associated with the given message may also be included in the given recipient list. In other embodiments, both address field data and filter data may be included in the recipient list. This master set of recipient lists can be used with any embodiment of the recipient prediction method.

The master set of recipient lists can then be updated by including the distribution lists of electronic messages that were sent since the master set of recipient lists was last updated or since it was created if this is the first update. The master set of recipient lists can be updated in a periodic fashion (e.g. on a daily or weekly basis), or it may be updated as soon as an electronic message is sent or received by the user of the mobile device 100. If the master set of recipient lists has been created, then step 352 of the method 350 includes scanning through the master set of recipient lists and adding any of the recipient lists which have at least one of the known recipients listed in the distribution list 304 thus far.

The next step 354 in the method 350 is to create a list of possible additional recipients based on occurrences of the recipients in the set of possible recipient lists. For a given recipient in a given possible recipient list, this step involves adding the given recipient to the list of possible additional recipients if this given recipient is not already in the distribution list 304 of the current message 300 and not already in the list of possible additional recipients. The list of possible additional recipients may be sorted in some manner such as ordering the last name of the recipients alphabetically. Other sorting techniques may be used. However, this sorting is optional.

Step 356 of method 350 involves applying a threshold to reduce the number of possible additional recipients that are provided to the user. The threshold may be based on a predetermined number of possible additional recipients that are to be displayed to the user. For instance, one, two or five possible additional recipients may be shown to the user. The threshold may also be based on some other factor. It should be noted that step 356 is optional and the default option may be to list all of the possible additional recipients. Alternatively, the default option for step 356 may be to list the most likely candidate from the list of possible additional recipients. If two or more possible additional recipients are most likely, then one of these recipients may be chosen arbitrarily. Various techniques may be used to determine the most likely possible additional recipient. For instance, embodiments using a numerical scoring or weighting method (examples of which are shown below) may be used to determine the most likely possible additional recipient.

Step 358 of the method 350 involves displaying the possible additional recipients to the user, either with or without thresholding as the case may be. In addition to displaying possible additional recipients to the user, step 358 may also include displaying a manual entry option to the user or, if there are no possible additional recipients to display, then step 358 may just provide the user with the option of manually entering the next recipient to add to the distribution list 304 of the electronic message 300.

Referring now to FIG. 7, shown therein is a flowchart diagram illustrating an alternative exemplary embodiment of a recipient prediction method 400 that may be used to create a list of additional possible recipients. The method 400 includes providing an ordered list of additional possible recipients based on the count (i.e. frequency of occurrence) of these additional possible recipients in the set of possible recipient lists. Step 352 is carried out as previously described. Step 402 is similar to step 354 except that if the given recipient is already in the list of possible additional recipients, a count is associated with the given recipient and increased by one (i.e. the count is the number of occurrences of the given recipient in the list of possible recipients that are searched). Step 404 then involves ordering the counted additional possible recipients based on the count in a decreasing manner. For counted possible additional recipients that have the same number of occurrences or count, these possible additional recipients can then be sorted alphabetically or in some other suitable manner.

Accordingly, method 350 not only provides a list of possible additional recipients, but rather gives priority to the possible additional recipients that are the best guesses or the most likely to be selected amongst the list of all possible additional recipients. However, selection of any possible additional recipient in the displayed list is also allowed.

Step 356 is optional. If step 356 is performed, thresholding may be applied to display a predefined number of possible additional recipients. Alternatively, thresholding may be applied on the basis of the absolute or relative count of each possible additional recipient. The absolute count is the total number of times that a given possible additional recipient occurs in the set of possible recipient lists. The relative count can be a percentage defined as the count of a given possible additional recipient divided by the highest count of a possible additional recipient. For instance, the following is an exemplary list of possible additional recipients and their associated count: {(Steve Brown, 4), (John Smith, 3), (Anna White, 2), (Linda Johnson, 2), (Mark Black, 1), (Elizabeth Frum, 1), and (Jack Green, 1)}. The corresponding relative count for this list is then {100, 75, 50, 50, 25, 25 and 25}. The threshold may be defined as a relative count of 50% or more. Accordingly, the displayed list of possible additional recipients is: {Steve Brown, John Smith, Anna White and Linda Johnson}. Step 358 is then carried out as described previously and the list of possible additional recipients is displayed.

To further illustrate the operation of the recipient prediction method, reference will now be made to Table 1 which shows an exemplary master set of recipient lists. The user is John Smith and he composes a message and adds Mary Brown as the first recipient for the distribution list. John then indicates that he will add another recipient to the distribution list. Both of the recipient prediction methods 350 and 400 can use the master set of recipient lists to create a set of possible recipient lists which each include Mary Brown. This set will include lists 1, 2, 3, 5 and 6 in which there are two occurrences of Jeff Davies, three occurrences of Dave Low, three occurrences of Steve White, and one occurrence of Paul Green. According to method 400, with no thresholding, the following list can be provided to the user: {Dave Low, Jeff Davies, Steve White, Paul Green}. Method 350 may provide a similar list but in an unordered fashion. The user then picks Dave Low.

TABLE 1

Exemplary Master set of recipient lists

1) John Smith, Mary Brown, Jeff Davies, Dave Low
2) John Smith, Mary Brown, Steve White, Dave Low
3) John Smith, Steve White, Mary Brown, Jeff Davies
4) John Smith, Paul Green, Steve White, Dave Low, John Smith
5) John Smith, Paul Green, Mary Brown, Dave Low
6) John Smith, Steve White, Mary Brown
7) John Smith, Paul Green The user then indicates that another possible additional recipient will be added to the current electronic message 300 and the recipient prediction method is executed once more. Note that in this case, the recipient prediction method may use the last generated set of possible recipient lists since these lists include the known recipients that have been selected by the user. Both of the recipient prediction methods 350 and 400 will then use the previous set of possible recipient lists to create a new set of possible recipient lists which each include Mary Brown and Dave Low. This set will include lists 1, 2 and 5 in which there is one occurrence of Jeff Davies, Steve White, and Paul Green. The user may pick Steve White.

The user then indicates that another possible additional recipient will be added to the current electronic message 300 and the recipient prediction method is executed once more. Both of the recipient prediction methods 350 and 400 will then go through the previous set of possible recipient lists and create a new set of possible recipient lists which each include Mary Brown, Dave Low and Jeff White. This set will include list 2 in which there are no occurrences of any other recipients. In this case, the method can provide the manual entry option to the user.

Figure 8:
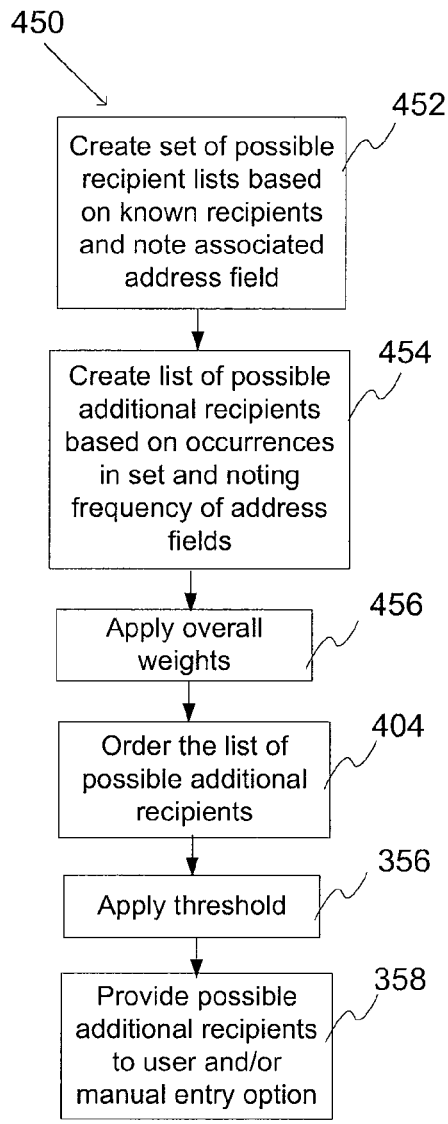
FIG. 8 is a flowchart diagram illustrating another alternative exemplary embodiment of a recipient prediction method that may be used to create a list of additional possible recipients.

Referring now to FIG. 8, shown therein is a flowchart diagram illustrating another alternative exemplary embodiment of a recipient prediction method 450 that may be used to create a list of additional possible recipients. Step 452 is similar to step 352 except that step 452 now includes noting the address field associated with each recipient in a given recipient list. For instance, rather than simply having a recipient list such as {Steve Brown, Linda Johnson, Elizabeth Frum}, the recipient list now indicates the associated address field as follows: {(Steve Brown, "From"), (Linda Johnson, "To"), (Elizabeth Frum, "Cc")}.

Step 454 of the method 450 is similar to step 402 except rather than just noting the frequency of a given recipient in the set of possible recipient lists that include the known recipients in the distribution list 304 of the current message 300, step 454 also notes the address field of the given recipient and how many times this occurs. For instance, assume that a recipient "John Smith" is listed in 7 messages which have all of the known recipients in the distribution list in the current message 300, and in which "John Smith" is listed in the "To" address field 5 times, in the "Cc" field 2 times and in the "Bcc" field 0 times. For method 400, the entry in the list of possible additional recipients can be ("John Smith", 7). In contrast, for method 450, the entry in the list of possible additional recipients can be: ("John Smith", "To", 5, "Cc", 2) or ("John Smith", 5, 2, 0) where it is assumed that the count for the "To", "Cc" and "Bcc" address fields automatically follow the recipient name in this exemplary order.

Step 456 of the method 450 then includes applying an overall weight to the recipients listed in the list of possible additional recipients based on the number of occurrences of a given recipient in the various address fields. Alternatively, this weighting step may also be done when the set of possible recipient lists is being generated in step 454. The weights are based on the address field associated with a given possible recipient and can be generated in a number of different ways. For instance, if the user has indicated that a recipient is to be added to the "To" address field, then all instances of a given possible recipient in the "To" address field can be provided with a larger weight than all instances of the given possible recipient in the "Cc" or "Bcc" address fields on the assumption that the user will likely want to pick the next recipient from recipients that were listed in the "To" address field of previous electronic messages. For instance, in this example, each occurrence of a possible recipient with an associated address field of "To" can be given a weight of three, each occurrence of a possible recipient with an associated address field of "Cc" can be given a weight of two and each occurrence of a possible recipient with an associated address field of "Bcc" can be given a weight of one. This provides an overall weight of 19 for the example of "John Smith" given above. For a given possible additional recipient, each weighted occurrence can be added to provide an overall weight for the given possible additional recipient. The weighted possible additional recipients can then be ordered based on overall weight in a decreasing fashion. Steps 356 and 358 are then performed as previously described.

Figure 9:
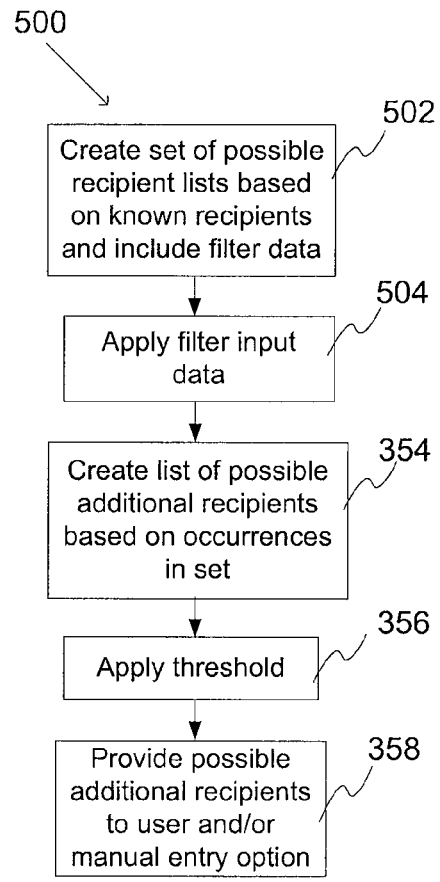
FIG. 9 is a flowchart diagram illustrating another alternative exemplary embodiment of a recipient prediction method that may be used to create a list of additional possible recipients; and, FIG. 10 is a flowchart diagram illustrating another alternative exemplary embodiment of a recipient prediction method that may be used to create a list of additional possible recipients.

Referring now to FIG. 9, shown therein is a flowchart diagram illustrating another alternative exemplary embodiment of a recipient prediction method 500 that may be used to create a list of additional possible recipients. Step 502' is similar to step 352 in methods 350 and 400 except that additional information is included in the recipient lists such as keywords that can be used as filter data to further reduce the set of possible recipient lists. This filter data can include specific words in the title of the email such as "Project", "Patent", a work ID number, the label "RE" or "FW" if the corresponding message is a replied message or a forwarded message respectively, and the like. Filter data may also be obtained from a certain component in the body of the message. Timestamps that indicate when a message was sent or received may also be used as filter data. For instance, the user may simply wish to search through stored messages that were received or sent in the past several weeks.

Step 504 then involves applying filter input data, as well as the current known recipients in the distribution list 304 of the current message 300, to the set of possible recipient lists to reduce the number of lists when searching for possible additional recipients to add to the distribution list 304. The filter input data may be automatically obtained from a corresponding portion of the current message 300 such as the subject 306 or a component of the body 308. In an alternative, the user may be prompted to provide the filter input data by providing a text entry or selecting from a list of choices. When filter input data has been determined from the current message 300, this filter input data is used to remove any list from the set of possible recipient lists that does not include matching filter data.

Further variations may be incorporated into the filter input data. For instance, one implementation may allow the user to also enter filter input data after the list of possible additional recipients has been generated (this occurs after step 358 and is not shown in FIG. 9). One variation is to enable search refinement by allowing the user to enter characters or partial names upon viewing the list of possible additional recipients.

For example, the user may enter the first letter of the first name or the last name of the desired possible additional recipient. In another instance, the user may type in the first letter of both the first name and the last name of the desired possible additional recipient.

The method 500 then includes applying steps 354, 356 and 358 as previously described. It should be noted that the gathering of filter data and application of filtering the set of possible recipient lists can be included in any one of methods 400 and 450.

Figure 10:
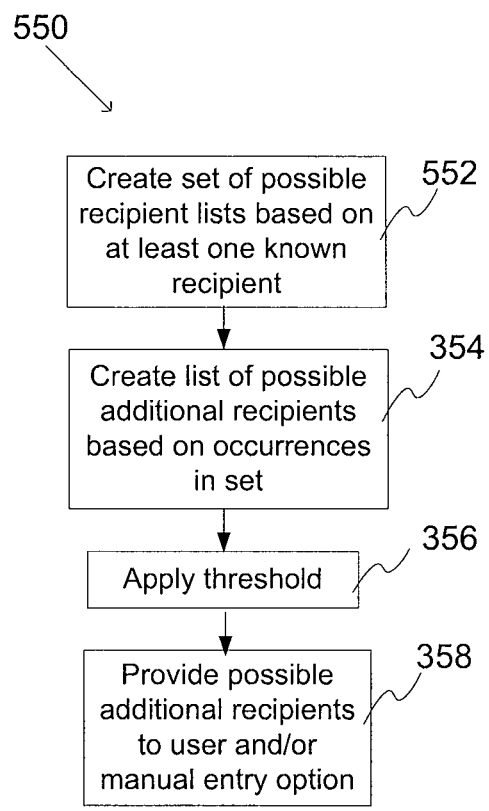

Referring now to FIG. 10, shown therein is a flowchart diagram illustrating another alternative exemplary embodiment of a recipient prediction method 550 that may be used to create a list of additional possible recipients. In contrast to the other embodiments of the recipient prediction method, method 550 includes creating a set of possible recipient lists based on at least one known recipient. This allows the recipient prediction module 138 to provide a list of possible additional recipients in cases where a new recipient is being added to the distribution list 304 of the current message 300. A new recipient means that this recipient is not in the distribution list of any previously received or sent electronic messages.

For example, assume that the user first enters a new recipient that is not on any previous distribution lists and then indicates that another recipient should be added to the distribution list 304 of the message 300. The method 550 notes that the first recipient is a new recipient, generates an empty list of possible additional recipients and indicates that the user must manually enter the next recipient. Once, the user enters a known recipient, the method 550, at step 552, then creates a set of possible recipient lists based on the known recipient as previously described for step 352 of method 350. A known recipient is a recipient that is in a distribution list of a previously sent or received electronic message associated with the user. Steps 354 to 358 are then performed as previously described.

In another instance, the user may have already entered one or more known recipients and then enters a new (i.e. unknown) recipient. Step 552 then involves determining that the set of possible recipient lists is empty since no previous distribution lists include the new recipient. At step 552, the recipient is identified as a new or unknown recipient and the step then involves creating a list based on the currently known recipients in the distribution list 304. If this is done for all of the currently known recipients in the distribution list 304, the last set of possible recipient lists may be stored so that this set does not have to be recreated when the latest recipient entered by the user is an unknown or new recipient and the distribution list 304 of the current message 300 already includes at least one known recipient. Steps 354 to 358 are then performed as previously described.

In one embodiment, step 552 can involve generating the set of possible recipient lists based on all known recipients in the distribution list 304. In another embodiment, step 552 can involve generating the set of possible recipient lists based on at least one known recipient in the distribution list 304.

Advantageously, method 550 can still provide the user with at least one possible additional recipient to add to the distribution list 304 of the current message 300 even when at least one of the current recipients in the distribution list 304 is unknown. It should be understood that method 550 can be combined with the numerical ordering of method 400, the weighting of method 450 or the filtering of method 500.

The implementation of the various recipient prediction methods described herein may use a variety of data structures to increase computational speed so that the recipient prediction method can be executed without perceptible delay to the user. For instance, an array of arrays or a FIFO may be used. Other data structures that may be used are commonly known to those skilled in the art.

To summarize, at least one embodiment described herein involves predicting a list of additional recipients for a communication message when a user composes a communication message on a communication device and indicates that there are multiple recipients. Once the user indicates that the message is to be sent to more than one recipient, a recipient prediction method is performed that involves determining, based on message information including other messages sent by the user, a list of possible additional recipients to add to the distribution list of the message. Advantageously, this allows the user to add one or more recipients to the distribution list while having to enter fewer keystrokes or other input (i.e. scrolling and clicking). Various alternatives exist for the recipient prediction method such as using filter data, weighting the possible additional recipients, and the like.

In one aspect, at least one embodiment described herein provides a method of predicting possible additional recipients to add to a distribution list of a current electronic message composed by a user on a communications device. When the distribution list has at least one known recipient and the user attempts to add an additional recipient to the distribution list, the method comprises:

a) creating a set of possible recipient lists that each include the at least one known recipient;

b) generating a list of possible additional recipients from the set of possible recipient lists based on occurrences recipients that are in at least one of the possible recipient lists and are not already in the distribution list; and, c) providing at least one entry from the list of possible additional recipients to allow the user to select the additional recipient to add to the distribution list if any possible additional recipients exist, otherwise allowing the user to manually enter the additional recipient.

In another aspect, at least one embodiment described herein provides a computer program product for predicting possible additional recipients to add to a distribution list of a current electronic message composed by a user on a communications device. The computer program product comprises a computer readable medium embodying program code means executable by a processor of the communications device for implementing a method for predicting the possible additional recipients, wherein when the distribution list has at least one known recipient and the user attempts to add an additional recipient, the method comprises:

a) creating a set of possible recipient lists that each include the at least one known recipient;

b) generating a list of possible additional recipients from the set of possible recipient lists based on occurrences of recipients that are in at least one of the possible recipient lists and are not already in the distribution list; and, c) providing at least one entry from the list of possible additional recipients to allow the user to select the additional recipient to add to the distribution list if any possible additional recipients exist, otherwise allowing the user to manually enter the additional recipient.

In another aspect, at least one embodiment described herein provides a microprocessor that controls the operation of the communications device; a communication subsystem connected to the microprocessor, the communication subsystem sends and receives data; a message application executable by the microprocessor, the message application allows a user to send electronic messages to two or more recipients; and, a recipient prediction module executable by the microprocessor, the recipient prediction module predicts possible additional recipients to add to a distribution list of a current electronic message composed by the user on the communications device, the distribution list having at least one known recipient, wherein when the user attempts to add an additional recipient to the distribution list, the recipient prediction module predicts the possible additional recipients by: creating a set of possible recipient lists that each include the at least one known recipient; generating a list of possible additional recipients from the set of possible recipient lists based on occurrences of recipients that are in at least one of the possible recipient lists and are not already in the distribution list; and, providing at least one entry from the list of possible additional recipients to allow the user to select the additional recipient to add to the distribution list if any possible additional recipient exist, otherwise allowing the user to manually enter the additional recipient.

It should be understood that various modifications can be made to the embodiments described and illustrated herein, without departing from the embodiments, the general scope of which is defined in the appended claims. It should also be understood that while the embodiments were described for a mobile device, the embodiments are generally applicable to any communication or computing device that can send electronic messages to two or more recipient addresses. For instance, the embodiments may be modified for implementation on a computer in which the communication subsystem may instead be a network connection or a modem.

The invention claimed is:

1. A mobile device comprising a processor and a memory, wherein the processor is configured to, for a current electronic message that is being composed to be sent from the mobile device:
   determine one or more known recipients in a distribution list of the current electronic message;
   scan one or more data stores for one or more previously sent or received messages, each of the one or more previously sent or received messages comprising one or more distribution lists;
   for each of the one or more previously sent or received messages,
      determine if all of the one or more known recipients of the current electronic message are listed in the one or more distribution lists of the previously sent or received message, and
      create a possible recipient list for the previously sent or received message if all of the one or more known recipients and at least one other recipient are identified in the one or more distribution lists of the previously sent or received message, wherein the possible recipient list comprises the at least one other recipient; and
   generate a list of possible additional recipients for display in a user interface of the mobile device, wherein each recipient in the list of possible additional recipients is individually selectable and is identified in at least one possible recipient list,
   wherein the processor is configured to generate the list of possible additional recipients by:
      for each individual recipient, excluding the one or more known recipients, that is identified in at least one possible recipient list created, determining a weight for the individual recipient based on frequency of occurrence of the individual recipient among all possible recipient lists created and on which address field of the one or more distribution lists of previously sent or received messages the individual recipient occurred; and
      identifying one or more individual recipients in the list of possible additional recipients, ordered by the weight.

2. The mobile device of claim 1, wherein the current electronic message identifies a sender, and wherein the processor is configured to exclude the sender from the list of possible additional recipients.

3. The mobile device of claim 2, wherein the processor is configured to generate the list of possible additional recipients by:
   for each individual recipient, excluding the one or more known recipients and the sender, that is identified in at least one possible recipient list created, determining a frequency of occurrence of the individual recipient among all possible recipient lists created; and
   identifying one or more individual recipients in the list of possible additional recipients, ordered by the frequency of occurrence.

4. The mobile device of claim 3, wherein the one or more individual recipients are identified in the list of possible additional recipients, ordered by decreasing frequency of occurrence.

5. The mobile device of claim 3, wherein a number of individual recipients identified in the list of possible additional recipients is based on a predetermined threshold.

6. The mobile device of claim 3, wherein exactly one individual recipient is identified in the list of possible additional recipients, the exactly one individual recipient being the individual recipient having a highest frequency of occurrence among all possible recipient lists created.

7. The mobile device of claim 3, wherein all individual recipients identified in at least one possible recipient list created are identified in the list of possible additional recipients.

8. The mobile device of claim 1, wherein for each of the one or more previously sent or received messages, the possible recipient list created for the previously sent or received message further comprises the one or more known recipients of the current electronic message.

9. The mobile device of claim 8, wherein the processor is configured to exclude the one or more known recipients from the list of possible additional recipients.

10. The mobile device of claim 1, wherein for each of the one or more previously sent or received messages, the possible recipient list created for the previously sent or received message comprises all recipients other than the one or more known recipients of the current electronic message that are identified in the one or more distribution lists of the previously sent or received message.

11. The mobile device of claim 1, wherein the processor is further configured to receive user input indicating an address field of the current electronic message to which an additional recipient is to be added, and to provide a highest weight to the address field of the one or more distribution lists of previously sent or received messages in determining the weight.

12. The mobile device of claim 1, wherein the processor is further configured to allow manual entry of an additional recipient.

13. A method of generating a list of possible additional recipients for a current electronic message that is being composed to be sent from a mobile device, wherein the method comprises:
   determining one or more known recipients in a distribution list of the current electronic message;

scanning one or more data stores for one or more previously sent or received messages, each of the one or more previously sent or received messages comprising one or more distribution lists;

for each of the one or more previously sent or received messages, determining, using a processor of the mobile device, if all of the one or more known recipients of the current electronic message are listed in the one or more distribution lists of the previously sent or received message, and creating a possible recipient list for the previously sent or received message if all of the one or more known recipients and at least one other recipient are identified in the one or more distribution lists of the previously sent or received message, wherein the possible recipient list comprises the at least one other recipient;

generating a list of possible additional recipients for display in a user interface of the mobile device, wherein each recipient in the list of possible additional recipients is individually selectable and is identified in at least one possible recipient list, and wherein the generating comprises, for each individual recipient, excluding the one or more known recipients, that is identified in at least one possible recipient list created:

determining a weight for the individual recipient based on frequency of occurrence of the individual recipient among all possible recipient lists created and on which address field of the one or more distribution lists of previously sent or received messages the individual recipient occurred; and identifying one or more individual recipients in the list of possible additional recipients, ordered by the weight.

14. The method of claim 13, wherein the current electronic message identifies a sender, and wherein the processor is configured to exclude the sender from the list of possible additional recipients.

15. The method of claim 14, wherein the generating comprises:

for each individual recipient, excluding the one or more known recipients and the sender, that is identified in at least one possible recipient list created, determining a frequency of occurrence of the individual recipient among all possible recipient lists created; and identifying one or more individual recipients in the list of possible additional recipients, ordered by the frequency of occurrence.

16. The method of claim 15, wherein the one or more individual recipients are identified in the list of possible additional recipients, ordered by decreasing frequency of occurrence.

17. The method of claim 15, wherein a number of individual recipients identified in the list of possible additional recipients is based on a predetermined threshold.

18. The method of claim 15, wherein exactly one individual recipient is identified in the list of possible additional recipients, the exactly one individual recipient being the individual recipient having a highest frequency of occurrence among all possible recipient lists created.

19. The method of claim 15, wherein all individual recipients identified in at least one possible recipient list created are identified in the list of possible additional recipients.

20. The method of claim 13, wherein for each of the one or more previously sent or received messages, the possible recipient list created for the previously sent or received message further comprises the one or more known recipients of the current electronic message.

21. The method of claim 20, further comprising excluding the one or more known recipients from the list of possible additional recipients.

22. The method of claim 13, wherein for each of the one or more previously sent or received messages, the possible recipient list created for the previously sent or received message comprises all recipients other than the one or more known recipients of the current electronic message that are identified in the one or more distribution lists of the previously sent or received message.

23. The method of claim 13, further comprising receiving user input indicating an address field of the current electronic message to which an additional recipient is to be added, and to provide a highest weight to the address field of the one or more distribution lists of previously sent or received messages in determining the weight.

* * * * *